United States Patent
Murakami et al.

(10) Patent No.: US 6,508,741 B1
(45) Date of Patent: Jan. 21, 2003

(54) HYDRAULIC CONTROL SYSTEM FOR AUTOMATIC TRANSMISSIONS

(75) Inventors: Akira Murakami, Susono (JP); Masanori Ohtake, Susono (JP); Hisanori Nomoto, Susono (JP); Nobuyuki Nagashima, Susono (JP); Mitsuhiro Umeyama, Susono (JP); Tomoe Osada, Gotenba (JP); Koji Oshima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 53 days.

(21) Appl. No.: 09/678,693

(22) Filed: Oct. 3, 2000

(30) Foreign Application Priority Data

Oct. 8, 1999 (JP) ............................................. 11-288640

(51) Int. Cl.$^7$ .............................. B60K 4/20; F16H 6/106
(52) U.S. Cl. .......................................... 477/95; 477/149
(58) Field of Search ................................. 477/2, 3, 4, 5, 477/70, 71, 75, 79, 94, 86, 95, 125, 126, 149; 192/3.37, 216

(56) References Cited

U.S. PATENT DOCUMENTS

| | | | | |
|---|---|---|---|---|
| 4,796,490 A | * | 1/1989 | Butts et al. ................. 477/148 |
| 4,899,785 A | * | 2/1990 | Inokuchi ................ 137/625.65 |
| 5,366,420 A | * | 11/1994 | Kuriyama et al. ........... 475/129 |
| 5,467,854 A | * | 11/1995 | Creger et al. ................. 477/154 |
| 5,741,200 A | * | 4/1998 | Taniguchi et al. ......... 477/71 X |
| 5,820,515 A | * | 10/1998 | Fukaya et al. ............. 477/95 X |
| 5,833,565 A | * | 11/1998 | Yasue et al. ................. 475/156 |
| 5,842,951 A | * | 12/1998 | Yasue et al. ................. 477/149 |
| 5,964,675 A | * | 10/1999 | Shimada et al. .......... 477/86 X |
| 5,982,045 A | * | 11/1999 | Tabata et al. .................. 290/17 |
| 6,081,042 A | * | 6/2000 | Tabata et al. ................... 475/5 |
| 6,176,807 B1 | * | 1/2001 | Oba et al. ........................ 477/5 |
| 6,217,479 B1 | * | 4/2001 | Brown et al. .................. 477/86 |
| 6,244,368 B1 | * | 6/2001 | Ando et al. ................. 477/2 X |
| 6,344,008 B1 | * | 2/2002 | Nagano et al. ................. 475/5 |

FOREIGN PATENT DOCUMENTS

| | | |
|---|---|---|
| JP | 5-248519 | 9/1993 |
| JP | 11-125273 | 5/1999 |

* cited by examiner

Primary Examiner—Charles A Marmor
Assistant Examiner—Roger Pang
(74) Attorney, Agent, or Firm—Kenyon & Kenyon

(57) ABSTRACT

A hydraulic control system for an automatic transmission, which has a frictional engagement unit adapted to be kept in a slipping state when in a predetermined speed changing state and in an applied state when in another gear ratio changing state; and a drain oil establishing member for establishing a drain oil when the frictional engagement unit is kept in the slipping state comprises a drain pressure switching mechanism for supplying the drain oil to the frictional face of the frictional engagement unit when the frictional engagement unit is kept in the slipping state.

12 Claims, 5 Drawing Sheets

FIG.5

| RANGES | RUNNING MODES | C1 | C2 | B1 |
|---|---|---|---|---|
| B, D | ETC MODE | × | ○ | × |
| | DIRECT-COUPLED MODE | ○ | ○ | × |
| | MOTOR DRIVE MODE | ○ | × | × |
| N, P | NEUTRAL | × | × | × |
| | CHARGING MODE | × | × | ○ |
| | ENGINE START (EXTREMELY LOW TEMPERATURE) | ○ | × | ○ |
| R | MOTOR DRIVE MODE | ○ | × | × |
| | R-FRICTION RUNNING MODE | ○ | × | ○ |

○ : APPLIED   × : RELEASED

HYDRAULIC CONTROL SYSTEM FOR AUTOMATIC TRANSMISSIONS

BACKGROUND OF THE INVENTION

1. Field of the Invention

The present invention relates to a hydraulic control system for controlling the applied states of frictional engagement units in an automatic transmission and, more particularly, to a system for controlling the supply of lubricating oil to the frictional faces of the frictional engagement units.

2. Related Art

There has been widely known an automatic transmission which is constructed to change gear ratios by applying/releasing frictional engagement units such as a friction clutch or a brake suitably to change the transmission path of a torque. In the automatic transmission of this kind, any of the frictional engagement units is applied or released to change the gear ratios. During the application/release, the applying force is gradually changed by the oil pressure to change the transmission torque capacity continuously. As a result, the output torque is smoothly changed, thereby preventing any physical shock, as might otherwise be felt by the driver of a vehicle when the gear ratios are changed.

These actions of the frictional engagement unit at the time of changing the gear ratios are caused by the slippage which occurs transiently in the frictional engagement unit to absorb the inertia force. By utilizing this function positively, the vehicle can be started without any shock. In the prior art, more specifically, a torque converter is arranged upstream of a gear speed change mechanism. Even if the torque converter is eliminated and replaced by a friction clutch, however, the output torque can be smoothly raised by controlling the friction clutch in a slipping manner at the start, thereby allowing the vehicle to start without any shock.

By controlling the frictional engagement unit in the slipping manner, the shock, as might otherwise be caused at the start, can be avoided. On the other hand, a heat is generated on the frictional face of the frictional engagement unit in which the slippage is occurring. In other words, the kinetic energy is absorbed as the thermal energy, which requires to take any steps to avoid the burnout. An example of these steps is disclosed in Japanese Patent Laid-Open No. 11-125273 (JP-A11-125273). The system as disclosed is an automatic transmission having a planetary gear mechanism for switching the forward and backward runs and a starting clutch which are arranged upstream of a continuously variable transmission. These planetary gear mechanism and starting clutch are accommodated in a housing filled with lubricating oil. As an engine is started to drive an oil pump, the lubricating oil is circulated in the housing and supplied to the starting clutch continuously to carry away the frictional heat, thereby preventing the temperature rise of the starting clutch and the deterioration in its durability.

In the system disclosed in the above-specified Japanese Patent Laid-Open, the starting clutch is controlled in the slipping state at the start of the vehicle and then kept in a completely applied state as accompanied by no slippage. While the engine is active, on the other hand, a substantially equal quantity of the lubricating oil is constantly circulated in the housing, considering the slippage state at the start, and supplied to the starting clutch.

Thus, the starting clutch can be sufficiently cooled at the start. However, even when the starting clutch is completely applied to establish no slippage, the supply of the lubricating oil is continued as before. This action makes the oil pump drive excessively for circulating the lubricating oil continuously, thereby permitting the motive power loss to occur. Moreover, the lubricating oil is excessively stirred to raise the temperature, thereby causing a disadvantage that the deterioration of the lubricating oil advances.

SUMMARY OF THE INVENTION

A main object of the invention is to provide a hydraulic control system for an automatic transmission which can cool frictional engagement units to be controlled in a slipping state and in an applied state, as accompanied by no slippage, without causing any motive power loss.

Therefore, the hydraulic control unit of the invention is provided with a mechanism for increasing the amount of lubricating oil to be supplied to the frictional face of a frictional engagement unit, by utilizing drain oil which is established while the frictional engagement unit is kept in the slipping state.

The mechanism for increasing the supply of the lubricating oil to the frictional face includes a mechanism for supplying the drain oil as it is to the frictional face or a change-over valve on which the drain oil acts as a signal pressure to increase the amount of the lubrication oil to be supplied.

In the invention, for example, a predetermined frictional engagement unit is controlled into the slipping state. Simultaneously with this control, another control is executed to establish the drain oil. This drain oil is supplied to the frictional face of the predetermined frictional engagement unit, as controlled into the slipping state, to increase the amount of oil supplied to the frictional face to promote the cooling. When the control into the slipping state is not executed, on the other hand, the drain oil is not supplied to the frictional face to decrease the amount of circulated oil, thereby reducing the consumption of the motive power.

In the invention, on the other hand, simultaneously with the control to bring the predetermined frictional engagement unit into the slipping state, another control is executed to establish the drain pressure. According to the control to bring the predetermined frictional engagement unit into the slipping state, the drain oil is supplied as the signal pressure to a change-over valve. This change-over valve opens a lubricating oil passage having a larger sectional area for supplying an increased amount of the lubricating oil to the frictional face to be controlled into the slipping state, thereby promoting the cooling of the frictional face. When the slip control is not executed, on the other hand, the lubricating oil passage having a larger sectional area is closed to decrease the supply of the lubricating oil, thereby reducing the consumption of the motive power.

The invention is further provided with an oil passage construction in which the oil pressure for controlling the frictional engagement unit into the slipping state is shut off when the drain oil is not utilized for increasing the amount of lubricating oil.

In the invention, therefore, when the drain oil cannot be circulated, that is, a sufficient lubricating oil cannot be supplied to the frictional face of the frictional engagement unit to be controlled into the slipping state, the oil pressure for controlling the frictional engagement unit into the slipping state is shut off. In short, the control of the predetermined frictional engagement unit into the slipping state is suppressed. Even if the lubrication for cooling the frictional face is troubled, therefore, the slipping control itself of the frictional engagement unit is suppressed to prevent the trouble such as the burnout of the frictional engagement unit, as might otherwise be caused by the frictional heating, in advance.

In the invention, moreover, the predetermined frictional engagement unit is controlled into the slipping state to transmit the torque while the vehicle is running or into the applied state, as accompanied by no slippage, to transmit the torque while the vehicle is not running.

In the invention, therefore, as the load on the frictional engagement unit is raised in the slipping control, the supply of oil is increased accordingly to avoid the burnout of the frictional face. In the case of the control into the applied state as accompanied by no slippage, on the other hand, the load on the frictional engagement unit is lowered to reduce the amount of supplied oil, thereby effectively avoiding the excessive circulation of the oil and the accompanying loss of the motive power.

In the invention, moreover, it is possible to have in the same direction the start which is effected by connecting an internal combustion engine and an electric motor as a motive power source and by controlling the frictional engagement unit into the slipping state while inputting the motive power from the internal combustion engine and the start which is effected by inputting the motive power from the electric motor while releasing the frictional engagement unit.

In the invention, therefore, when the vehicle is started by the motive power of the internal combustion engine while being accompanied by the slippage of the predetermined frictional engagement unit, the amount of oil to be supplied to the frictional engagement unit is increased to avoid the temperature rise, as might otherwise accompany the slippage with the high loading motive power, to prevent the trouble such as the burnout in advance. When the vehicle is driven by the electric motor without being accompanied by the slippage of the frictional engagement unit, on the other hand, the amount of oil to be supplied to the frictional engagement unit is decreased so that the unnecessary consumption of the motive power, as might otherwise be caused by supplying excessive oil, can be prevented.

The above and further objects and novel features of the invention will more fully appear from the following detailed description when the same is read with reference to the accompanying drawings. It is to be expressly understood, however, that the drawings are presented for the purpose of illustrations only and are not intended as a definition of the limits of the invention.

BRIEF DESCRIPTION OF THE DRAWINGS

FIG. 5 is a table enumerating the shift ranges, which can be selected in the power transmission system shown in FIG. 4, and the running modes which are set for the individual shift ranges.

DETAILED DESCRIPTION OF THE PREFERRED EMBODIMENTS

Figure 4:
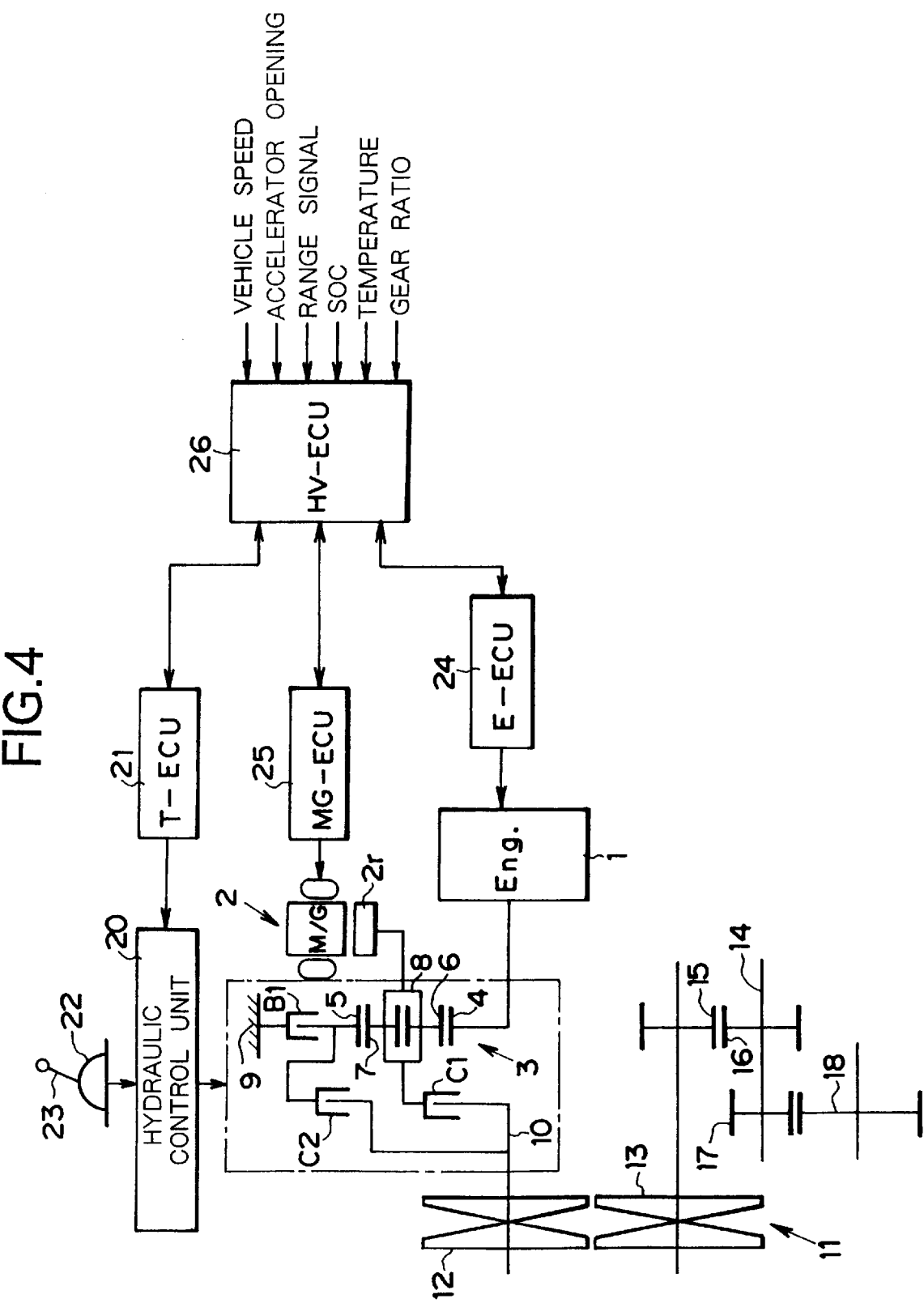
FIG. 4 is a skeleton diagram schematically showing one example of a power transmission system, to which the invention is applied.

The invention will be described in connection with its specific embodiments with reference to the accompanying drawings. First of all, an automatic transmission to which the invention can be applied is exemplified in FIG. 4. In the example shown in FIG. 4, the invention is constructed as an automatic transmission of a hybrid drive system such that an internal combustion engine 1 or a first power source and an electric motor 2 or a second power source output their motive powers separately or synthetically. The internal combustion engine 1 is a prime mover such as a gasoline engine or a Diesel engine for outputting its motive power by burning a fuel. The internal combustion engine will be shortly referred to as the engine (or Eng.) 1 in the following description.

On the other hand, the electric motor 2 is a prime mover for outputting a motive power by rotating with the supply of an electric current, and can be exemplified by motors of various types including a synchronous type and further by an electric motor having a power generating function. In the following description, therefore, the electric motor will be exemplified by one having the power generating function and will be referred to as the motor/generator (M/G) 2.

As a system for outputting the motive powers of these engine 1 and the motor/generator 2 separately or synthetically, there is provided a power transmission system which is constructed mainly of a double-pinion type planetary gear mechanism 3. The planetary gear mechanism 3 is constructed to include three rotary elements: an external gear or a sun gear 4; an internal gear or a ring gear 5 arranged concentrically with the sun gear 4; and a carrier 8 retaining a first pinion gear 6 meshing with the sun gear 4 and a second pinion gear 7 meshing with the first pinion gear 6 and the ring gear 5, rotatably and revolvably. Thus, the planetary gear mechanism 3 has a well known construction in which differential actions are established among these three rotary elements.

Of these rotary elements, the sun gear 4 is connected to the output shaft (e.g., the crankshaft) of the engine 1. When the engine 1 is exemplified by a reciprocating engine, the fluctuations or vibrations of torque are caused by the intermittent combustion of the fuel. In order to absorb or damp these vibrations, therefore, a damper mechanism (although not shown) may be interposed between the engine 1 and the sun gear 4. In this case, the torsion characteristics of the damper mechanism are set by considering the resonance between the engine 1 and the motor/generator 2. This motor/generator 2 has a rotor 2r connected to carrier 8.

Between the ring gear 5 and a casing 9, on the other hand, there is interposed a brake B1. This brake B1 is provided for fixing the ring gear 5 selectively so that it can be exemplified by a frictional engagement type such as a wet type multi-disc brake or a band brake interposed between the ring gear 5 and the casing 9.

An output shaft 10 acting as an output member is arranged coaxially with the engine 1. There are two clutches as coupling means for transmitting the motive power selectively to the output shaft 10. These two clutches are: a first clutch C1 for coupling the carrier 8 and the output shaft 10 selectively; and a second clutch C2 for coupling the ring gear 5 and the output shaft 10 selectively. These clutches C1 and C2 can be exemplified not only by the wet multi-disc type to be hydraulically applied/released but also by a variety of types such as the engaging type. Moreover, the output shaft 10 is connected to a belt type continuously variable transmission 11.

This continuously variable transmission 11 has a well-known construction in which a driving pulley (primary pulley) 12 and a driven pulley (secondary pulley) 13 having variable groove widths are arranged in parallel and in which the winding radius of a (not shown) belt, as made to run on those pulleys 12 and 13, is changed by varying the groove widths to change the gear ratios continuously.

In parallel with the driven pulley 13, there is arranged a counter shaft 14. These driven pulley 13 and counter shaft 14 are coupled by a pair of counter gears 15 and 16. On the other hand, another gear 17 is mounted on the counter shaft 14 and meshes with an output gear 18. This output gear 18 is exemplified by a ring gear of a (not-shown) differential unit.

The planetary gear mechanism 3 thus far described also performs a differential action so that its function can be utilized to select a variety of running modes. These running modes can be set by applying the aforementioned brake B1 and clutches C1 and C2 selectively. For these selective applications, there are provided: a hydraulic control unit 20 for controlling the brake B1 and the clutches C1 and C2; an electronic control unit (T-ECU) 21 for outputting control signals to the hydraulic control unit 20; and a shift unit 22 for switching the oil passages of the hydraulic control unit 20.

This hydraulic control unit 20 is constructed mainly of various change-over valves and pressure regulator valves, and solenoid valves (although none of them are not shown) for outputting signal pressures for the controls. On the other hand, the electronic control unit 21 is constructed to compute various data inputted and to output instruction signals based on the computed results to the solenoid valves of the hydraulic control unit 20, thereby to set a predetermined running mode. Moreover, the shift unit 22 is equipped with a shift lever 23 for selecting shift ranges (or shift positions) corresponding to selected running modes.

The shift ranges are composed of parking (P), reverse (R), neutral (N), drive (D) and brake (B) ranges. Of these shift ranges, the parking and neutral ranges are provided for holding the vehicle in the stop state, causing no application of the clutches C1 and C2. On the other hand, the drive and brake ranges are provided for driving the vehicle forward, causing no application of the brake B1. Moreover, the reverse range is provided for driving the vehicle backward. In this reverse range, the first clutch C1 is applied so that the carrier 8 acts as the output element. According to these shift ranges, moreover, the running modes are set, as will be described hereinafter.

According to these running modes, on the other hand, the engine 1 and the motor/generator 2 have to be activated/inactivated. For these operations, there are provided electronic control units (E-ECU and MG-ECU) 24 and 25 for controlling the engine 1 and the motor/generator 2, respectively. Each of the electronic control units 21, 24 and 25 thus far enumerated is constructed to include a processing unit (CPU or MPU), memory units (RAM and ROM) and an input/output interface as its main components, and to perform computations on the basis of data inputted and programs stored in advance, thereby to output signals according to the computed results. Moreover, those electronic control units 21, 24 and 25 are connected for data communications with a hybrid control unit (HV-ECU) 26 made of a similar electronic control unit.

This hybrid control unit 26 is constructed to judge the running modes to output control signals to the individual electronic control units 21, 24 and 25. The data to be employed in these electronic control units 21, 24 and 25 and the hybrid control unit 26 are exemplified by: a vehicle speed; an accelerator opening (not-shown accelerator pedal depression); a range signal selected by the shift unit 22; a state of charge (SOC) of a (not-shown) battery for charging/discharging the motor/generator 2; a battery temperature; and a gear ratio set by the continuously variable transmission 11.

Here will be described the running modes. In accordance with each shift range, one or more running modes are set, as tabulated in FIG. 5. In the drive range and the brake range, more specifically, there are set an ETC mode, a direct-coupled mode and a motor drive mode. Among these modes, the ETC mode is set when a relatively high driving force is demanded. In this ETC mode, the output torque of the engine 1 is amplified by the planetary gear mechanism 3 and the motor/generator 2 and then is outputted. In this mode, therefore, only the second clutch C2 is applied. Specifically: the sun gear 4 of the planetary gear mechanism 3 is caused to act as an input element by inputting the torque of the engine 1 to it; the carrier 8 is caused to act as a reaction element by connecting the motor/generator 2 to it; and the ring gear 5 is connected to the output shaft 10 through the second clutch C2 to act as an output element. With these actions, if the torque is inputted from the engine 1 to the sun gear 4, the carrier 8 will rotate in the opposite direction of the sun gear 4. In the ring gear 5 acting as the output element, on the other hand, there is established a torque which is amplified from the torque to be inputted from the engine 1 in accordance with the gear ratio (i.e., the ratio between the tooth number of the sun gear and the tooth number of the ring gear) of the planetary gear mechanism 3, when the reaction torque having the rotation direction of the engine 1 is inputted to the carrier 8 by the motor/generator 2. As a result, a high driving force can be achieved. In this case, moreover, the three rotary elements of the planetary gear mechanism 3 rotate relative to one another. Especially, the speeds of the pinion gears 6 and 7 retained by the carrier 8 are higher than those of the sun gear 4 and the carrier 8.

The direct-coupled mode is provided for driving the vehicle mainly by the engine 1 with the planetary gear mechanism 3 being directly coupled in its entirety. Thus, both the clutches C1 and C2 are connected (or applied). As a result, the two rotary elements, i.e., the carrier 8 and the ring gear 5 of the planetary gear mechanism 3 are integrally coupled to integrate the planetary gear mechanism 3 in its entirety. As a result, the torque is transmitted, as it is outputted from the engine 1, to the output shaft 10. Therefore, this running mode is set when the vehicle runs at a constant speed under a relatively low load with an excellent running efficiency of the engine 1. In this running mode, moreover, the driving torque may be increased by adding the output of the motor/generator 2, or the electric power can be generated by driving the motor/generator 2 with the torque of the engine 1.

The motor drive mode is provided for driving the vehicle exclusively by the motor/generator 2. Thus, only the first clutch C1 is connected (or applied) to connect the motor/generator 2 directly to the output shaft 10. This motor drive mode is set for starting the vehicle because the output torque of the motor/generator 2 can be made high even at a low speed.

When the vehicle is to run, therefore, it is started in the motor drive mode, and the engine 1 is then activated to switch this motor drive mode into the direct-coupling mode when the speeds of the engine 1 and the motor/generator 2 are substantially equalized. When an accelerator pedal is deeply depressed to increase the demanded driving force either at the start or during the running in the direct-coupling mode, the ETC mode is set to supplement (or assist) the driving force of the engine 1 by the output of the motor/generator 2. In any of these running modes, on the other hand, the motor/generator 2 and the output shaft 10 are coupled in the torque transmitting manner so that the energy can be regenerated at a deceleration by driving the motor/generator 2 with the running inertia of the vehicle.

In the neutral range and the parking range, there are set the individual drive states for the neutral state, the charging mode and the engine start at an extremely low temperature. In the neutral state, the planetary gear mechanism 3 does not perform the function to transmit the motive power, so that the clutches C1 and C2 and the brake B1 are released.

In the charging mode, on the other hand, the motor/generator 2 is driven by the engine 1 with no motive power being transmitted to the output shaft 10, so that only the brake B1 is applied. As a result, the sun gear 4 is rotated by the engine 1 with the ring gear 5 of the planetary gear mechanism 3 being fixed, so that the carrier 8 acting as the output element rotates backward of the sun gear 4. In short, the motor/generator 2 is driven by the engine 1 to rotate backward of the engine 1, thereby performing the power generating action.

Since a high torque is required to start the engine 1 at an extremely low temperature, moreover, the engine 1 is driven by the motor/generator 2 to be started. This is the opposite state to the charging mode because the input and output of the motive power are reversed. Specifically, the motor/generator 2 is driven in the reverse direction of the forward direction of the engine 1 with the ring gear 5 being fixed by applying only the brake B1. As a result, the carrier 8 rotates backward to rotate the sun gear 4 and the engine 1 connected to the former forward, thereby starting the engine 1.

The reverse range is provided as the shift range for driving the vehicle backward, and either the motor/generator 2 or the engine 1 can be employed as the motive power source of this backward driving force. In this reverse range, specifically, the motor drive mode can be established, and the output shaft 10 is rotated in the backward running direction by rotating the motor/generator 2 in reverse while only the first clutch C1 is applied to couple the motor/generator 2 directly to the output shaft 10. In this case, the output torque of the motor/generator 2 can be controlled independently of the speed, so that the vehicle can be started backward with the first clutch C1 being completely maintained in the connected state, that is, in the applied state as accompanied by no slippage.

When the vehicle is to be driven backward by the engine 1, on the contrary, the reverse rotation (inverting function) is caused by the planetary gear mechanism 3 so that the transmission torque at the brake B1 may be gradually increased to effect the start without any shock. This is the friction running mode. Specifically, the brake B1 is applied to fix the ring gear 5, and the first clutch C1 is connected (or applied) to operate the carrier 8 as the output element. When the sun gear 4 is rotated forward by the engine 1, the carrier 8 rotates in reverse (in the backward running direction). At the time of starting the engine 1, however, the load from the output shaft 10 cannot be applied to the engine 1, and the torque of the output shaft 10 abruptly rises to cause any shock if the brake B1 is applied instantly at the time of the backward run from the neutral state. When the vehicle is driven backward by the motive power of the engine 1, therefore, the torque of the output shaft 10 is reduced to zero by releasing the brake B1 to apply no reaction torque to the ring gear 5, and then the brake B1 is gradually applied to raise the reaction torque of the ring gear 5 gradually. In short, the brake B1 is progressively applied from the released state through a slipping state to a completely applied state. Thus, the torque of the output shaft 10 gradually rises from zero so that the vehicle can be smoothly started.

With the automatic transmission thus far described, the vehicle is basically driven backward by the power of the motor/generator 2. When a high driving force is demanded for the backward run, that is, when the accelerator pedal is deeply depressed for the backward run, the vehicle is driven backward by the driving force of the engine 1. In order to smoothen this backward start, with the first clutch C1 being applied, the brake B1 is controlled from the released state to the slipping state and then to the completely applied state. For the backward runs by the motor/generator 2 and by the engine 1, therefore, the thermal load on the brake B1, i.e., the value of the heat generation at the brake B1 is different. In the hydraulic control unit 20 according to the invention, therefore, the brake B1 is lubricated to correspond to the difference.

Figure 1:
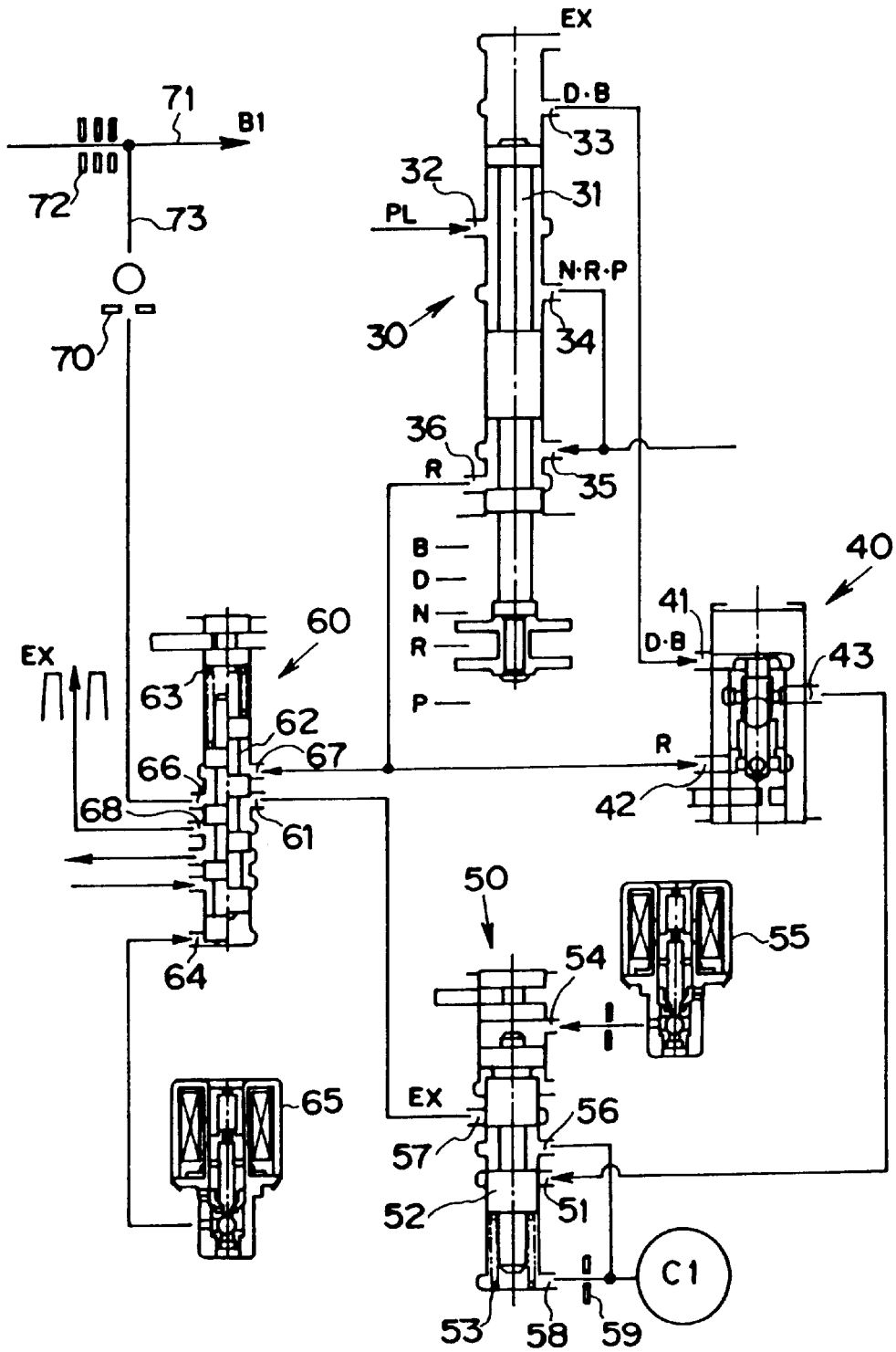
FIG. 1 is a diagram showing a portion of one example of a hydraulic circuit belonging to a hydraulic control system according to the invention.

FIG. 1 shows one example, in which the drain pressure (or the drain oil) accompanying the control of the applying pressure of the first clutch C1 is utilized for lubricating (or cooling) the brake B1. Reference numeral 30 in FIG. 1 designates a manual valve which is so constructed that a spool 31 is moved back and forth in the axial direction by the shift lever 23 of the aforementioned shift unit 22. Specifically, the manual valve 30 is constructed to move its spool 31 to each of the P (parking), R (reverse), N (neutral), D (drive) and B (brake) positions in accordance with the shift positions (or shift ranges) which can be selected by the shift unit 22, and to output an oil pressure (or range pressure) according to each position.

At a substantially central portion of the manual valve 30 in the axial direction, more specifically, there is formed an first input port 32 to which a line pressure (PL) is: inputted. In the D-position and the B-position, the first input port 32 is caused to communicate with a first output port 33 thereby to output a D-range pressure and a B-range pressure from the first output port 33. In the N-position, the R-position and the P-position, on the other hand, the first input port 32 is caused to communicate with a second output port 34 thereby to output an N-range pressure, an R-range pressure and a P-range pressure from the second output port 34. In the manual valve 30, there is further formed a second input port 35 which communicates with the second output port 34 at all times. In the R-position, the second input port 35 is caused to communicate with a third output port 36 so that the R-range pressure, when the R-position is selected, is outputted from the third output port 36.

The first output port 33 and the third output port 36 of the manual valve 30 are connected with different input ports 41 and 42 of a shuttle valve 40, respectively. This shuttle valve 40 is constructed to move its spool with the oil pressure applied to one of the input port 41 and the input port 42, thereby opening an output port 43 but closing an input port to which a lower oil pressure is applied. As a result, the shuttle valve 40 is constructed to output either the D-range pressure and the B-range pressure or the R-range pressure. The output port 43 is connected to an input port 51 of a C1 control valve 50 for controlling the applying pressure of the first clutch C1.

This C1 control valve 50 is a pressure regulator valve for outputting an oil pressure according to the axial force to act on a spool 52, i.e., the regulation level. A spring 53 is arranged on one end side of the spool 52, and a signal pressure port 54 is formed in the opposite side of the spring 53. With the signal pressure port 54, there is connected a solenoid valve (as will be tentatively called the "second solenoid valve") 55 which is duty-controlled to output an oil pressure according to the duty ratio. At a substantial central portion of the C1 control valve 50 in the axial direction, on the other hand, there is formed an output port 56 which is open irrespective of the position of the spool 52. The input port 51 is formed on the side of the spring 53 as positioned away from the output port 56, and a drain port 57 is formed in the opposite side or on the side of the signal pressure port 54. Moreover, the output port 56 is connected with a (not-shown) servo oil chamber of the first clutch C1 and is caused to communicate through an orifice 59 with a feedback port 58 which is formed in the end portion accommodating the spring 53.

Therefore, the input port 51 and the output port 56 come into communication so that the first clutch C1 is supplied with the oil pressure to have a higher applying pressure. As this applying pressure gradually rises, the force to push the spool 52 together with the spring 53 exceeds the axial force based on the oil pressure of the second solenoid valve 55 which is applied to the signal pressure port 54. As a result, the input port 51 is closed whereas the drain port 57 is opened by the spool 52 so that the output port 56 communicates with the drain port 57. As a result, the oil pressure of the first clutch C1 and the oil pressure of the feedback port 58 drop so that the spool 52 moves in the direction to compress the spring 53 thereby to close the drain port 57. At the same time, the input port 51 and the output port 56 restore their communication to supply the oil pressure to the first clutch C1. In short, as the oil pressure (or signal pressure) to be applied to the signal pressure port 54 becomes higher, the oil pressure to be outputted becomes higher. During this pressure regulating action, on the other hand, the oil pressure is released from the drain port 57.

This drain port 57 is connected with a drain pressure input port 61 of a cutback valve 60. This cutback valve 60 is a switch-over valve for outputting an oil pressure to switch the tension of the (not-shown) belt of the aforementioned continuously variable transmission 11 to higher and lower stages. A spring 63 is arranged on one end side of a spool 62, and a signal pressure port 64 is formed on the other end side. With this signal pressure port 64, there is connected a solenoid valve (as will be tentatively called the "first solenoid valve") 65 which is controlled ON/OFF. This first solenoid valve 65 is exemplified by a normally closed type and is constructed to output the signal pressure in the ON state but not in the OFF state.

Moreover, the cutback valve 60 is provided with: an output port 66 communicating with the drain pressure input port 61 at all times; an R-range pressure input port 67 formed adjacent, on the upper side of the drawing, to the drain pressure input port 61; and a drain port 68 adjacent, on the opposite side of the R-range pressure input port 67, to the drain pressure input port 61. The R-range pressure input port 67 is made to communicate with the third output port 36 of the manual valve 30. When the first solenoid valve 65 is controlled ON due to a small depression, that is a low demanded driving force, the spool 62 is pushed in the direction to compress the spring 63 so that the drain pressure input port 61 and the output port 66 come into communication with the drain port 68. When the first solenoid valve 65 is controlled OFF due to a high demanded driving force, on the contrary, no oil pressure is applied to the signal pressure port 64, so that the spool 62 is pushed toward the signal pressure port 64 by the spring 63 thereby to bring the output port 66 into communication with the drain pressure input port 61 and the R-range pressure input port 67.

The output port 66 in the cutback valve 60 is connected through a check valve 70 with a lubricating oil passage 71 for the brake B1. More specifically, the lubricating oil passage 71 for the brake B1 is equipped with an orifice 72 for permitting the flow of the minimum necessary lubricating oil in the state in which no slip control is executed, and is connected with an oil passage 73 having the check valve 70 arranged downstream of the orifice 72 in the supplying direction of the lubricating oil. Accordingly, the drain oil of the C1 control valve 50 is selectively supplied to the lubricating oil passage 71 for the brake B1 through the cut valve 60 and the check valve 70.

The actions of the hydraulic circuit, as shown in FIG. 1, will be described in the case of a backward run. For this backward run, the R-range is selected by the shift unit 22. In the manual valve 30, the spool 31 is set to the position shown in FIG. 1, so that the first input port 32 communicates with the second output port 34 and the second input port 35 having communication with the second output port 34 communicates with the third output port 36. As a result, the line pressure PL inputted from the first input port 32 is outputted as the R-range pressure through the second output port 34, the second input port 35 and the third output port 36. This R-range pressure is supplied, on one hand, through the shuttle valve 40 to the input port 51 of the C1 control valve 50 and, on the other hand, to the R-range pressure input port 67 of the cutback valve 60.

When the R-range is selected by the shift unit 22, the electronic control unit 21 outputs the instruction signal for setting the reverse gear stage on the basis of the shift position signal. This instruction signal is outputted to apply the first clutch C1 and the brake B1. For the first clutch C1, the duty ratio of the second solenoid valve 55 is controlled so that the signal pressure to be applied to the signal pressure port 54 of the C1 control valve 50 rises gradually. In other words, the pressure regulating level of the C1 control valve 50 gradually rises to raise the applying pressure of the first clutch C1 gradually. This regulation of the oil pressure by the C1 control valve 50 can be made by draining the supplied oil pressure partially from the drain port 57. During the pressure regulation by the C1 control valve 50, therefore, the drain oil is supplied from the drain port 57 to the drain pressure input port 61 of the cutback valve 60.

Unless the accelerator pedal is especially deeply depressed in the case of the backward run, the demanded driving force is so low that the first solenoid valve 65 is controlled OFF to output the signal pressure. As a result, the signal pressure is applied to the signal pressure port 64 of the cutback valve 60 so that the spool 62 is moved in the direction to compress the spring 63. Then, the drain pressure input port 61 comes into communication with the drain port 68 to release the drain oil which has been supplied from the C1 control valve 50 to the drain port 68. On the other hand, the R-range pressure input port 67 is closed to receive no R-range pressure. As a result, the lubricating oil passage 71 for the brake B1 is supplied with the lubricating oil under the original lubrication pressure only through the orifice 72 but not from the oil passage 73. Here, the inflow to the oil passage 73 is obstructed by the check valve 70.

Since the demanded driving force is low, on the other hand, the running mode for the backward run is effected by the motor drive mode so that the brake B1 is released.

Therefore, the brake B1 in this released state may be supplied with the minimum amount of the lubricating oil that has been throttled by the orifice 72. In the above-described control, this minimum amount of lubricating oil is supplied to the brake B1 so that the motive power for driving the oil pump of the lubricating oil can be reduced to suppress or prevent the power loss. Even when the brake B1 is released, on the other hand, the ring gear 5 to be selectively fixed by the brake B1 rotates to establish a relative rotation between a stationary side member and a movable side member of the brake B1. By minimizing the amount of the lubricating oil to be supplied, as described above, the amount of the lubricating oil to be left between the stationary member and the movable member is reduced to lower the so-called "drag torque" to be established through the lubricating oil accordingly. In this respect, too, the power loss is suppressed or prevented. Moreover, the lubricating oil is not excessively circulated to, suppress or prevent the degradation, as might be otherwise caused by the temperature rise.

When a high driving force is demanded by depressing the accelerator pedal deeply, on the other hand, the first solenoid valve 65 is controlled OFF to output the oil pressure for increasing the tension of the belt of the continuously variable transmission 11. Accordingly, the signal pressure is not applied to the signal pressure port 64 of the cutback valve 60 so that the spool 62 is pushed toward the signal pressure port 64 by the spring 63. Once the drain port 66 is shut off from the drain pressure input port 61, therefore, the R-range pressure input port 67 is opened to communicate with the output port 66. As a result, the drain oil and the R-range pressure are supplied from the output port 66 via the oil passage 73 to the lubricating oil passage 71 for the brake B1.

When the demanded driving force for the backward run is high, on the other hand, the friction running mode is set, as tabulated in FIG. 5, so that the brake B1 is controlled into the applied state accompanied by the slippage. The brake B1 in this slipping state is supplied with a throttled amount of lubricating oil through the orifice 72 and the incoming oil via the oil passage 73. When the brake B1 is controlled into the slipping state, more specifically, the amount of the lubricating oil is increased. Even if the brake B1 generates heat on its frictional face, therefore, the heat is carried away by the lubricating oil to promote the cooling of the brake B1, thereby to prevent the temperature rise or seizure of the frictional face or the reduction in the durability of the brake B1. With the construction thus far described, on the other hand, the drain oil is utilized for lubricating the brake B1 so that the system can be made compact without increasing the number of valves.

Figure 2:
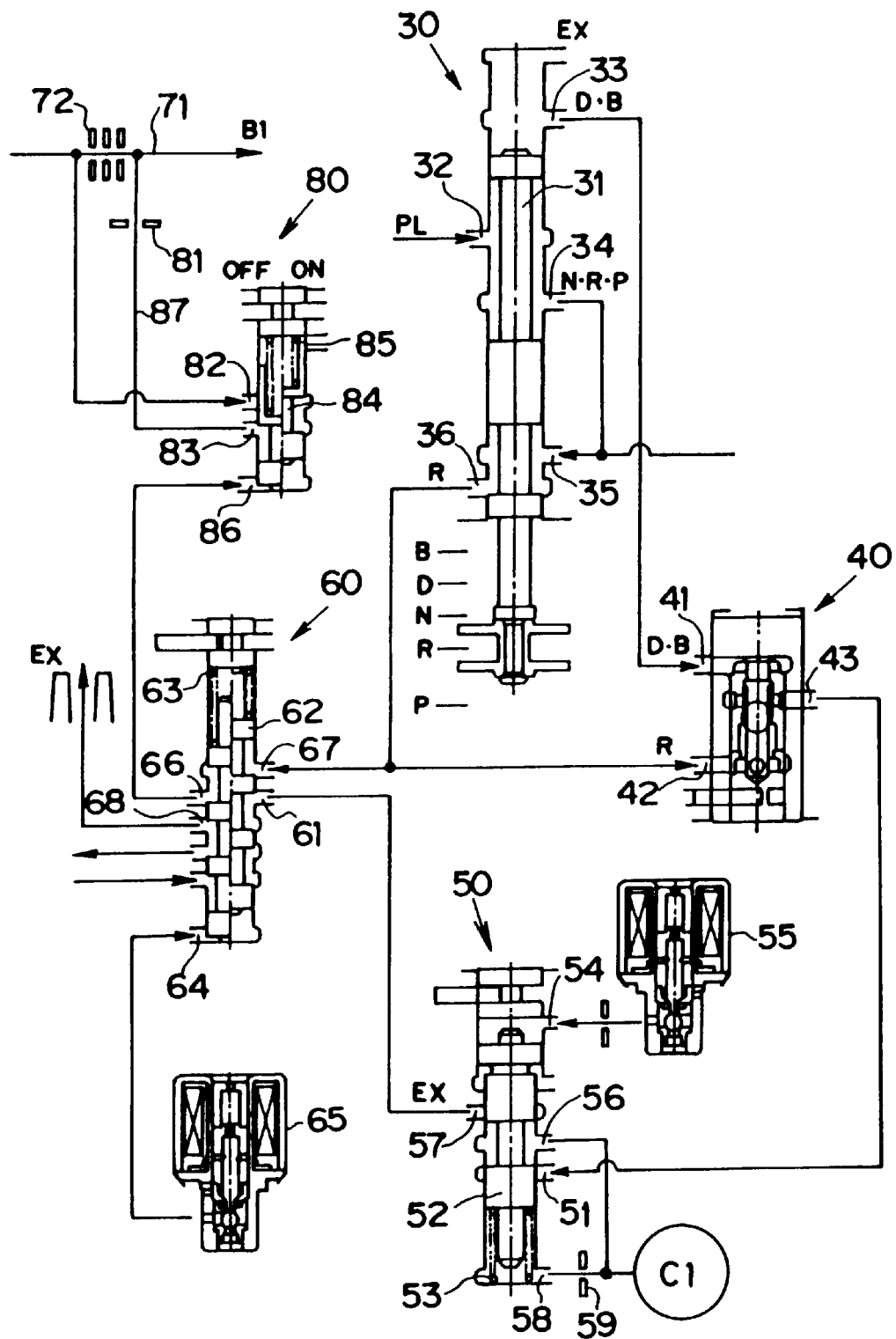
FIG. 2 is a diagram showing a portion of another example of the hydraulic circuit belonging to the hydraulic control system according to the invention.

Another specific embodiment of the invention will be described with reference to FIG. 2. The embodiment shown in FIG. 2 is different from the embodiment shown in FIG. 1 in that the drain oil is not employed as lubricating oil but is utilized as a control pressure for increasing the amount of lubricating oil to be supplied. Specifically, the aforementioned check valve 70 may be replaced by a control valve 80 and a large orifice 81.

This control valve 80 has an input port 82 and an output port 83 opened/closed by a spool 84, and a spring 85 is arranged on one end of the spool 84 whereas a signal pressure port 86 is formed in the other end of the spool 84. Moreover, the output port 66 of the cutback valve 60 is connected with the signal pressure port 86. With the input port 82 and the output port 83, still moreover, there is connected an oil passage 87 which is branched from the lubricating oil passage 71 and bypasses the orifice 72. The oil passage 87 is provided with the large orifice 81. This large orifice 81 has a larger sectional area than that of the orifice 72 which is disposed in the lubricating oil passage 71. The remaining construction is similar to that shown in FIG. 1.

With the construction shown in FIG. 2, too, when the demanded driving force is low when the R-range is selected, the drain pressure input port 61 of the cutback valve 60 communicates with the drain port 68. In this case, therefore, the signal pressure is not applied to the signal pressure port 86 of the control valve 80. As a result, the spool 84 of the control valve 80 is pushed toward the signal pressure port 86 by the spring 85 to shut the input port 82 and the output port 83. In short, the oil passage 87 having the large orifice 81 is closed, so that the brake B1 is supplied with a small amount of lubricating oil only from the lubricating oil passage 71 which is throttled by the orifice 72.

Since the demanded driving force is low, in this case, the motor drive mode is set in the R-range to release the brake B1. Even if the amount of the lubricating oil to be supplied is small, therefore, no trouble occurs in the lubrication process. Since the lubricating oil is not excessively supplied, moreover, the power loss such as the so-called "pump loss" or "drag loss" can be prevented while suppressing or preventing the degradation of the lubricating oil, as might otherwise caused by the temperature rise.

When a high driving force is demanded by depressing the accelerator pedal deeply, on the other hand, the friction running mode is set for driving the vehicle by the engine 1. Specifically, not only the first clutch C1 but also the brake B1 is applied, and the control is made to raise the tension of the belt of the continuously variable transmission 11. Specifically, the first solenoid valve 65 is controlled OFF to interrupt the output of the signal pressure. As a result, the pressure is released from the signal pressure port 64 of the cutback valve 60 to cause the spool 62 to move toward the signal pressure port 64 by the elastic force of the spring 63, so that the drain port 68 is closed to generate the oil pressure in the output port 66.

Thus, the drain pressures of the C1 control valve 50 and the R-range pressure are applied as the signal pressure from the output port 66 to the signal pressure port 86 of the control valve 80. As a result, the spool 84 moves in the direction to compress the spring 85, so that the input port 82 and the output port 83 communicate with each other to open the oil passage 87. Therefore, the brake B1 is supplied with the lubricating oil not only via the lubricating oil passage 71 through the orifice 72 having the smaller sectional area but also via the oil passage 87 through the large orifice 81. When the brake B1 is controlled in the slipping state, as in the specific embodiment shown in FIG. 1, the amount of lubricating oil is increased. Even if heat is generated on the frictional face of the brake B1, therefore, the heat is carried away by the lubricating oil to promote the cooling of the brake B1, thereby preventing the temperature rise or the seizure of the frictional face or the reduction in the durability of the brake B1. In the above-described construction shown in FIG. 2, on the other hand, the drain oil is employed as signal pressure but not positively released so that the influence such as the drop in the line pressure can be avoided.

Figure 3:
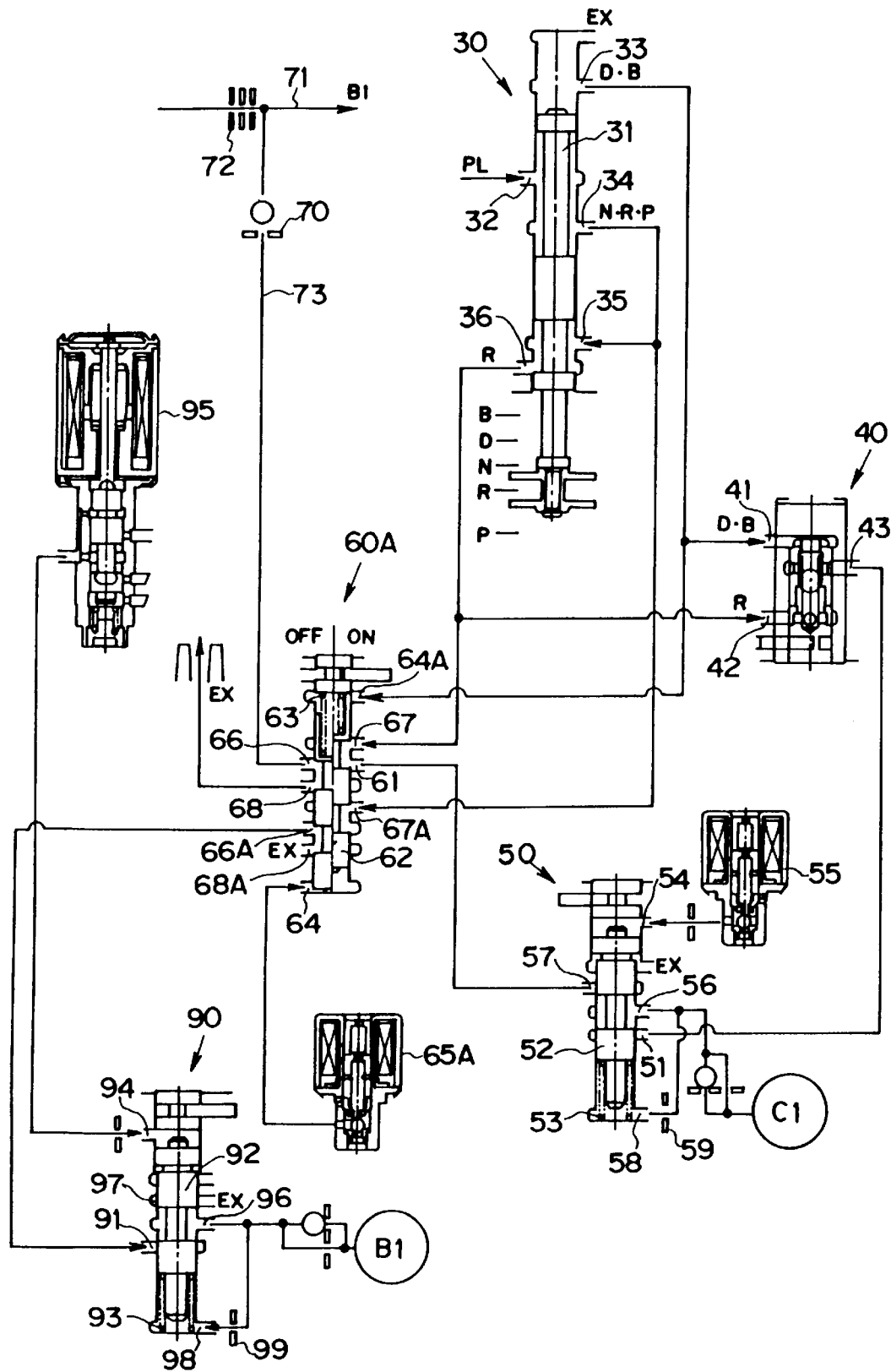
FIG. 3 is a diagram showing a portion of still another example of the hydraulic circuit belonging to the hydraulic control system according to the invention.

A specific embodiment having a fail-safe function will be described with reference to FIG. 3. This construction shown in FIG. 3 is modified from the foregoing construction of FIG. 1 by forming new ports in the cutback valve to supply the oil pressure to the brake B1 by way of the new ports. Specifically, a cutback valve 60A shown in FIG. 3 is provided with a second input port 67A, a second output port 66A, a second signal pressure port 64A in addition to the aforementioned drain pressure input port 61, an R-range pressure input port 67, an output port 66 and a drain port 68. Among these new ports, the second input port 67A is connected with the second output port 34 of the manual valve 30 and is supplied with the N-range pressure, the R-range pressure and the P-range pressure. This second input port 67A is formed in the opposite side of the drain pressure input port 61 across the drain port 68. The second output port 66A is formed in the opposite side of the drain port 68 across the second input port 67A. Moreover, a second drain port 68A is formed in the opposite side of the second input port 67A across the second output port 66A. This arrangement allows the second output port 66A to communicate selectively with the second input port 67A and the second drain port 68A. On the other hand, the second signal pressure port 64A is formed in the end portion where the spring 63 is arranged, and is connected with the first output port 33 of the aforementioned manual valve 30. When the D-range and the B-range are set, the second signal pressure port 64A is supplied with the D-range pressure or the B-range pressure so that the spool 62 is moved to and held at the side of the signal pressure port 64.

The second output port 66A of the cutback valve 60A is connected with an input port 91 of a B1 control valve 90 for controlling the applying pressure of the brake B1. This B1 control valve 90 is a pressure regulator valve similar to the aforementioned C1 control valve 50. In the B1 control valve 90, a spring 93 is arranged on one end side of a spool 92, and a signal pressure port 94 is formed on the other side of the spring 93. The signal pressure port 94 is connected with a linear solenoid valve 95 capable of changing the output pressure linearly. Moreover, an output port 96 is formed at a substantially central portion of the B1 control valve 90 in the axial direction and is open independent of the position of the spool 92. The input port 91 is formed on the side of the spring 93, as positioned away from the output port 96, and a drain port 97 is formed on the side of the signal pressure port 94, as positioned on the opposite side of the spring 93. Moreover, the output port 96 is connected with a (not-shown) servo oil chamber of the brake B1, communicating with a feedback port 98, as formed in the end portion accommodating the spring 93, through an orifice 99.

When the input port 91 comes into communication with the output port 96 and the oil pressure is supplied to the bake B1 to raise the applying pressure gradually, the pressure for pushing the spool 92 together with the spring 93 exceeds the axial force which is based on the oil pressure of the linear solenoid valve 95 applied to the signal pressure port 94. As a result, the spool 92 closes the input port 91 but opens the drain port 97 to communicate with the output port 96. This causes the drop of both the oil pressure of the brake B1 and the oil pressure in the feedback port 98 to move the spool 92 in the direction to compress the spring 93 and to close the drain port 97, thereby restoring the communication of the input port 91 and the output port 96 to supply the oil pressure to the brake B1. In short, as the oil pressure (or the signal pressure) to be applied to the signal pressure port 94 is higher, the oil pressure to be outputted becomes higher. During this pressure regulation, on the other hand, the oil pressure is drained from the drain port 97.

Here, the construction shown in FIG. 3 is different from that shown in FIG. 1 in that the solenoid valve for outputting the signal pressure to the cutback valve 60A is exemplified by a normally open type solenoid valve 65A. The remaining construction is similar to that shown in FIG.

When the R-range is selected for the backward run by the shift unit 22 and the demanded driving force is low, in the construction shown in FIG. 3, the solenoid valve 65A is controlled OFF to output no signal pressure. In the cutback valve 60A, therefore, the oil pressure does not act on the signal pressure port 64, so that the spool 62 is pushed toward the signal pressure port 64 by the spring 63. Accordingly, the R-range pressure input port 62 is closed, and the output port 66 is opened to communicate with the drain port 68 to apply no oil pressure to the oil passage 73. In other words, the supply of the lubricating oil to the brake B1 is effected through the orifice 72 having the small opening sectional area to be limited to a small value. On the other hand, the second input port 67A is closed to block the R-range pressure, as outputted from the second output port 34 of the manual valve 30, thereby applying no R-range pressure to the B1 control valve 90. In short, the brake B1 is maintained in the released state.

If the demanded driving force is high, on the contrary, the solenoid valve 65A is controlled ON to output the signal pressure to the signal pressure port 64 of the cutback valve 60A. This causes the output port 66 of the cutback valve 60A to communicate with the drain pressure input port 61 and the R-range pressure input port 67, so that a large amount of lubricating oil is supplied to the brake B1 via the oil passage 73.

At the same time, the second input port 67A communicates with the second output port 66A to apply the R-range pressure to the input port 91 of the B1 control valve 90. In this state, the linear solenoid valve 65A outputs a signal pressure at a predetermined level, so that the B1 control valve 90 regulates the pressure at a pressure regulation level corresponding to the signal pressure, thereby controlling the brake B1 into the slipping state. As a result, the applying pressure of the brake B1 gradually rises to allow the vehicle to start slowly backward, and the sufficient amount of lubricating oil is supplied to the brake B1 in the slipping state to cool its frictional face.

Moreover, when the construction of FIG. 3 causes a failure in which the solenoid valve 65A is kept to be OFF or a valve stick (or failure) in which the output port 66 of the cutback valve 60A cannot be shut from the drain port 68, the output port 66, as connected with the oil passage 73 for increasing the lubrication of the brake B1, is left in communication with the drain port 68, so that the lubricating oil cannot be increased in accordance with the slip control of the brake B1.

At the same time, the second input port 67A of the cutback valve 60A is left shut off. As a result, the R-range pressure is not applied to the input port 91 of the B1 control valve 90, so that the applying pressure is not applied to the brake B1. In the case of a failure to increase the supply of the lubricating oil to the brake B1, the oil pressure for applying the brake B1 in the slipping state is cut to inhibit the application of the brake B1. In other words, the lubrication failure inhibits the slip control of the brake B1, thereby avoiding the situation in advance that the brake B1 is burnt out due to the trouble in lubrication.

Here will be described the relations between the individual specific embodiments and the invention. The brake B1 corresponds to the frictional engagement unit of the invention; the speed change mechanism including the planetary gear mechanism 3 and the continuously variable transmission 11 corresponds to the automatic transmission of the invention; and the C1 control valve 50 corresponds to the drain oil establishing member of the invention. On the other hand, the individual cutback valves 60 and 60A correspond to the drain pressure switching mechanism of the invention. Moreover, the lubricating oil passage 71 and the oil passage 87 correspond to the lubricating oil passage of the invention, and the control valve 80 corresponds to the change-over valve of the invention.

The foregoing individual specific embodiments have been described by exemplifying the hydraulic control unit which is applied to the automatic transmission in the hybrid car. However, the invention should not be limited to those specific embodiments but could be widely applied to hydraulic controls unit to be applied to general automatic transmissions. Moreover, the drain pressure switching mechanism and the change-over valve may perform the functions defined individually in the scope of the appended Claims but should not be limited to the shown constructions. Moreover, the shutting mechanism may be any if it could shut the oil pressure for bring the frictional engagement unit into the slipping state. Therefore, the shutting mechanism need not shut the original pressure for the application but could shut the control pressure for the slipping state. Still moreover, FIG. 3 shows the construction in which the shutting mechanism is added to the system of FIG. 1. However, the invention could be modified by adding the shutting mechanism to the system of FIG. 2. Specifically, the cutback valve 60 of FIG. 2 could be replaced by the cutback valve 60A shown in FIG. 3.

The advantages to be obtained from the invention will be synthetically described in the following. According to the invention, drain oil accompanying another control, which is executed simultaneously with the control for bringing a predetermined frictional engagement unit into the slipping state, is supplied to the frictional face of the predetermined frictional engagement unit, so that the frictional face can be cooled sufficiently with the increase of the oil to be supplied. Unless the frictional engagement unit is controlled into the slipping state, on the other hand, the drain oil is not supplied to the frictional face to reduce the amount of the circulated oil and lower the power loss, thereby improving the fuel economy for the vehicle. Moreover, no special device or valve is required so that the system can be made compact.

According to the invention, on the other hand, the drain pressure accompanying another control, which is executed simultaneously with the control for bringing the predetermined frictional engagement unit into the slipping state, is applied as the signal pressure to the change-over valve. Thus, the change-over valve opens the lubricating oil passage having the larger sectional area, thereby supplying the increased lubricating oil to the frictional face to be controlled into the slipping state to cool the frictional face sufficiently. Unless the slip control is performed, on the other hand, the lubricating oil passage having the larger sectional area is closed to reduce the supply of the lubricating oil and lower the power loss, thereby improving the fuel economy for the vehicle. On the other hand, the drain pressure is used only as the signal pressure but is not drained to avoid the influence such as the drop in the oil pressure.

According to the invention, moreover, if there rises a trouble that the drain oil cannot be passed or that sufficient lubricating oil cannot be supplied to the frictional face of the frictional engagement unit to be controlled into the slipping state, the oil pressure for controlling the frictional engagement unit into the slipping state is shut. As a result, the slip control itself of the frictional engagement unit is inhibited if the lubrication for cooling the frictional face is troubled. This inhibition makes it possible to prevent the trouble of the frictional engagement unit, as might otherwise be caused due to the burnout by the frictional heat, in advance.

In the slip control according to the invention, moreover, while the load on the frictional engagement unit rises, the amount of the oil to be supplied is increased, thereby to prevent the burnout of the frictional face of the frictional engagement unit. In the control into the applied state as accompanied by no slippage, on the other hands, the load on the frictional engagement unit lowers to decrease the amount of the oil to be supplied, thereby to effectively prevent the oil from circulating excessively and the accompanying power loss from occurring.

According to the invention, still moreover, when the vehicle is started by the motive power of the internal combustion engine while being accompanied by the slippage of the predetermined frictional engagement unit, the amount of oil to be supplied to the frictional engagement unit is increased to avoid the temperature rise accompanying the slippage in the state of a high loading motive power, thereby preventing the trouble such as the burnout in advance. When the vehicle is driven by the electric motor without being accompanied by the slippage of the frictional engagement unit, on the other hand, the amount of oil to be supplied to the frictional engagement unit can be reduced to prevent the unnecessary consumption of the motive power, as might otherwise be caused by the excessive supply of the oil.

What is claimed is:

1. A hydraulic control system for an automatic transmission, which has a frictional engagement unit adapted to be kept in a slipping state while being in a redetermined gear ratio changing state and in an applied state while being in another gear ratio changing state; and a drain oil establishing member for establishing a drain oil when the frictional engagement unit is kept in the slipping state, comprising:

a drain port formed at the drain oil establishing member for outputting the drain oil from the drain oil establishing member, a lubricating oil passage for feeding the oil to a frictional face of said frictional engagement unit, and a drain pressure switching mechanism for supplying said drain oil to a frictional face of said frictional engagement unit connecting the drain port to the lubricating oil passage when said frictional engagement unit is kept in the slipping state, and for connecting the drain port to a drainage when the frictional engagement unit is released.

2. A hydraulic control system for an automatic transmission according to claim 1, wherein said frictional engagement unit includes a frictional engagement unit adapted to be kept in the slipping state for a predetermined period while it is changed from a released state to an applied state.

3. A hydraulic control system for an automatic transmission according to claim 1, wherein said frictional engagement unit includes a frictional engagement unit adapted to be kept in the slipping state for a predetermined period while it is changed from a released state to an applied state when a vehicle mounting said automatic transmission thereon starts.

4. A hydraulic control system for an automatic transmission according to claim 1, further comprising:

a first motive power source connected to said automatic transmission; and a second motive power source connected to said automatic transmission and having a lower output than that of said first motive power source, wherein said frictional engagement unit includes a frictional engagement unit adapted to be kept in the slipping state when the vehicle is started by said first motive power source.

5. A hydraulic control system for an automatic transmission according to claim 4, wherein said first motive power source includes an internal combustion engine, and wherein said second motive power source includes one of a motor and a motor/generator.

6. A hydraulic control system for an automatic transmission according to claim 5, wherein said frictional engagement unit includes a frictional engagement unit adapted to be kept in the slipping state when the vehicle is started backward by said internal combustion engine and in the applied state when the vehicle is started backward by said motor or said motor/generator.

7. A hydraulic control system for an automatic transmission according to claim 5, wherein said frictional engagement unit includes a frictional engagement unit adapted to be kept in the slipping state when the vehicle is started backward by said internal combustion engine and in the applied state when an electric power is generated by said motor/generator.

8. A hydraulic control system for an automatic transmission according to claim 1, wherein said automatic transmission includes: an input element to which a torque is inputted; a stationary rotary element of which rotation is blocked; and an output element for outputting a torque, wherein said frictional engagement unit includes a frictional engagement unit for stopping the rotation of said stationary rotary element gradually, and wherein said drain oil establishing member includes a pressure regulating mechanism for regulating the oil pressure of another frictional engagement unit for connecting said output element to a predetermined output member.

9. A hydraulic control system for an automatic transmission according to claim 1, wherein said drain pressure switching mechanism includes:

a change-over valve having: an input port to be supplied with said drain oil; an output port communicating with said frictional face; a drain port; and a valve member for causing said input port to communicate selectively with said drain port; and a control oil pressure establishing mechanism for establishing a control oil pressure for moving said valve member.

10. A hydraulic control system for an automatic transmission according to claim 9, further comprising:

a check valve disposed in an oil passage leading from said output port to said frictional face for blocking the flow of oil from said frictional face to said output port, wherein said input port and said output port are always made to communicate with each other.

11. A hydraulic control system for an automatic transmission according to claim 9, wherein said control oil pressure establishing mechanism includes a solenoid valve adapted to be electrically controlled ON/OFF for outputting a control oil pressure.

12. A hydraulic control system for an automatic transmission according to claim 1, further comprising:

a shutting mechanism for shutting the oil pressure for controlling said frictional engagement unit into the slipping state while said drain pressure switching mechanism is acting in a state in which drain oil is not supplied to said frictional face.

* * * * *

UNITED STATES PATENT AND TRADEMARK OFFICE
CERTIFICATE OF CORRECTION

PATENT NO. : 6,508,741 B1
DATED : January 21, 2003
INVENTOR(S) : Akira Murakami et al.

It is certified that error appears in the above-identified patent and that said Letters Patent is hereby corrected as shown below:

Column 16,
Line 40, delete "supplying said".
Line 41, delete "drain oil to a frictional face of said frictional engage-".
Line 42, delete "ment unit".

Column 17,
Lines 31 and 36, delete "stationary".

Signed and Sealed this

Third day of June, 2003

JAMES E. ROGAN
*Director of the United States Patent and Trademark Office*